United States Patent
Kolmanovsky et al.

(10) Patent No.: US 6,178,749 B1
(45) Date of Patent: Jan. 30, 2001

(54) METHOD OF REDUCING TURBO LAG IN DIESEL ENGINES HAVING EXHAUST GAS RECIRCULATION

(75) Inventors: Ilya V. Kolmanovsky, Ypsilanti; Michiel J. Van Nieuwstadt, Ann Arbor, both of MI (US); Paul Eduard Moraal, Wuerselen (DE)

(73) Assignee: Ford Motor Company, Dearborn, MI (US)

( * ) Notice: Under 35 U.S.C. 154(b), the term of this patent shall be extended for 0 days.

(21) Appl. No.: 09/237,737

(22) Filed: Jan. 26, 1999

(51) Int. Cl.$^7$ .................................................. F02M 25/07
(52) U.S. Cl. ........................................................ 60/605.2
(58) Field of Search ............................ 60/600, 601, 602, 60/603, 605.2

(56) References Cited

U.S. PATENT DOCUMENTS

| | | |
|---|---|---|
| 5,123,246 | 6/1992 | Younessi et al. . |
| 5,187,935 | 12/1993 | Akiyama, et al. . |
| 5,520,161 | 5/1996 | Klopp . |
| 5,794,445 * | 8/1998 | Dungner ........................ 60/605.2 |
| 6,029,451 * | 2/2000 | Gartner ........................... 60/605.2 |
| 6,035,639 * | 3/2000 | Kolmanovsky et al. ......... 60/605.2 |

FOREIGN PATENT DOCUMENTS

| | | | |
|---|---|---|---|
| 196 07 071 A1 | 2/1996 | (DE) . | |
| 198 02 106 A1 | 1/1998 | (DE) . | |
| 0 774 574 A1 | 5/1997 | (EP) . | |
| 0 786 589 A1 | 7/1997 | (EP) . | |

* cited by examiner

Primary Examiner—Michael Koczo
(74) Attorney, Agent, or Firm—Jerome R. Drouillard

(57) ABSTRACT

A method of reducing turbo lag in a compression ignition engine having an exhaust gas recirculation system (EGR) and a variable geometry turbocharger (VGT). The method includes the steps of determining an intake manifold pressure and intake manifold mass airflow setpoint, $MAP_d$ and $MAF_d$, as a function of the current engine speed and requested fueling rate ($W_{fREQ}$). The method further includes modifying the setpoints by a transient governor to generate modified setpoints, $MAF_c$ and $MAP_c$, as a function of $MAF_d$ and $MAP_d$, respectively, and feeding the modified setpoints to the controller to drive the turbocharger and EGR valve to the desired setpoints, thereby maximizing the amount of fresh air admitted to the engine during transient operation. Another embodiment of the method for reducing turbo lag coordinates the controller gains between the EGR and VGT. The method speeds up the MAF response by using multivariable control of both the EGR and VGT to aggressively regulate airflow to the desired setpoint.

9 Claims, 4 Drawing Sheets

METHOD OF REDUCING TURBO LAG IN DIESEL ENGINES HAVING EXHAUST GAS RECIRCULATION

TECHNICAL FIELD

This invention relates to turbocharged compression ignition engines and, more particularly, to methods of reducing turbo lag in turbocharged diesel engines having an exhaust gas recirculation (EGR) system.

BACKGROUND OF THE INVENTION

High performance, high speed diesel engines are often equipped with turbochargers to increase power density over a wider engine operating range, and EGR systems to reduce the production of NOx emissions.

Turbochargers use a portion of the exhaust gas energy to increase the mass of the air charge delivered to the engine combustion chambers. The larger mass of air can be burned with a larger quantity of fuel, thereby resulting in increased power and torque as compared to naturally aspirated engines.

A typical turbocharger consists of a compressor and turbine coupled by a common shaft. The exhaust gas drives the turbine which drives the compressor which, in turn, compresses ambient air and directs it into the intake manifold. Variable geometry turbochargers (VGTs) allow the intake airflow to be optimized over a range of engine speeds. This may be accomplished by changing the angle of the inlet guide vanes on the turbine stator. An optimal position for the inlet guide vanes is determined from a combination of desired torque response, fuel economy, and emissions requirements.

EGR systems are used to reduce NOx emissions by increasing the dilution fraction in the intake manifold. EGR is typically accomplished with an EGR valve that connects the intake manifold and the exhaust manifold. In the cylinders, the recirculated exhaust gas acts as an inert gas, thus lowering the flame and in-cylinder gas temperature and, hence, decreasing the formation of NOx. On the other hand, the recirculated exhaust gas displaces fresh air and reduces the air-to-fuel ratio of the in-cylinder mixture.

A particular problem with turbocharged diesel engines is poor acceleration, particularly from idle or low engine speeds. This "turbo-lag" is due to the time delay associated with filling the intake manifold with enough fresh air to support the amount of fuel required to satisfy the operator's torque demand. To meet this requirement, however, the delivered fuel often must be limited as a function of the available air in order to maintain the air-to-fuel ratio above the threshold at which visible smoke occurs. The rate at which the air supply can be increased is limited by the dynamics of the turbocharger and the transport delay between the turbocharger compressor and the intake manifold of the engine.

A traditional control strategy for diesel engines having an EGR system and a VGT is two single loop controllers. In other words, the two devices are controlled independently with the EGR valve controlling the mass of airflow into the intake manifold (MAF), and the VGT controlling the intake manifold pressure (MAP, or boost). The desired values for compressor mass airflow (MAF) and boost pressure (MAP) are stored as lookup table values referenced to engine speed and load or fueling rate. For each engine speed and fueling rate, the control algorithm retrieves the desired values for MAP and MAF and controls the EGR and VGT to achieve those values.

The two single loop controllers can be represented as follows:

$$EGR = K_{EGR}(MAF - MAF_d)$$

$$VGT = K_{VGT}(MAP - MAP_d)$$

wherein the subscript "d" denote the desired setpoints for the given variable. The controller K is usually a proportional-integral-derivative (PID) controller, with gains scheduled on the speed-load condition of the engine.

The desired setpoints for MAP and MAF are typically optimized for steady-state engine operation. Because these values were optimized for steady-state engine operation, however, they are poorly suited for generating feedback errors to drive the EGR and VGT during transient conditions. This straightforward engine control strategy often results in excessively large turbo lag and slow engine torque response.

To improve acceleration, some engine control systems use a transient detection feature to turn off the feedback control to the EGR and close the EGR valve when fuel limiting is active. This is done to provide as much fresh air as possible to the intake manifold so that the maximum amount of fuel can be injected without violating the air/fuel threshold at which visible smoke occurs. The independent feedback control for MAF is then reinitiated after the transient condition is over and the engine is essentially operating at steady-state. Such engine control strategies fail to account for the interaction between the VGT and EGR, however, because of their independent control of the two systems.

Thus, there exists a need to control the EGR and VGT and, hence, MAF and MAP, to deliver fuel to the engine at a rate which generates the torque demanded by the driver, yet maintains the air/fuel ratio above the threshold at which visible smoke occurs.

DISCLOSURE OF THE INVENTION

One object of the present invention is to provide a fast airflow response during transient engine operating conditions to reduce turbo lag.

Another object is to modify the setpoints for MAP and MAF during transient engine operations to reduce turbo lag.

A further object of the invention is to coordinate the control of the VGT and EGR to speed up the system response and, thereby, reduce turbo lag.

The invention is advantageous in that it improves engine system performance while preventing the occurrence of visible smoke or, viewed another way, reduces the smoke content of the engine exhaust gas while maintaining engine performance.

According to the present invention, the foregoing and other objects and advantages are obtained by a method of reducing turbo lag in a compression ignition engine having an EGR system and a VGT. The method comprises the steps of determining an intake manifold pressure and intake manifold mass airflow setpoint, $MAP_d$ and $MAF_d$, as a function of the current engine speed and requested fueling rate ($W_{fREQ}$) and generating modified setpoints, $MAF_c$ and $MAP_c$, as a function of $MAF_d$ and $MAP_d$, respectively. These modified setpoints are then compared to the actual MAF and MAP values to generate control signals for the turbocharger and EGR valve. The controller then dynamically adjusts the position of the EGR valve and turbocharger vanes to drive the turbocharger and EGR valve to the modified setpoints, thereby maximizing the amount of fresh air admitted to the engine during transient operation.

Thus, the setpoints for MAP and MAF are dynamically modified by a shaping filter before being fed to the controller. Accordingly, during transient conditions such as tip-in, the modified setpoints cause the EGR valve to close, and the VGT to initially open, then close, as the EGR valve moves toward the desired position. This coordinates the EGR and VGT actions during transient operation, insuring that the maximum amount of fresh air is admitted to the engine during transient conditions. Furthermore, this control strategy is implemented without modifying the feedback control law.

According to another aspect of the present invention, control of the EGR and VGT is coordinated to aggressively regulate airflow to the desired setpoint value, particularly during low engine speed conditions. This control strategy further includes the steps of generating the turbocharger control signal as a function of MAP, $MAP_d$, MAF and $MAF_d$, and generating the EGR valve control signal as a function of MAP, $MAP_d$, MAF and $MAF_d$. The method thus increases the MAF response by using multivariable control of both the EGR and VGT to aggressively regulate airflow to the desired setpoint, particularly during low airflow engine operation.

Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should now be had to the embodiments illustrated in greater detail in the accompanying drawings and described below by way of examples of the invention. In the drawings.

DESCRIPTION OF THE PREFERRED EMBODIMENT

Figure 1:
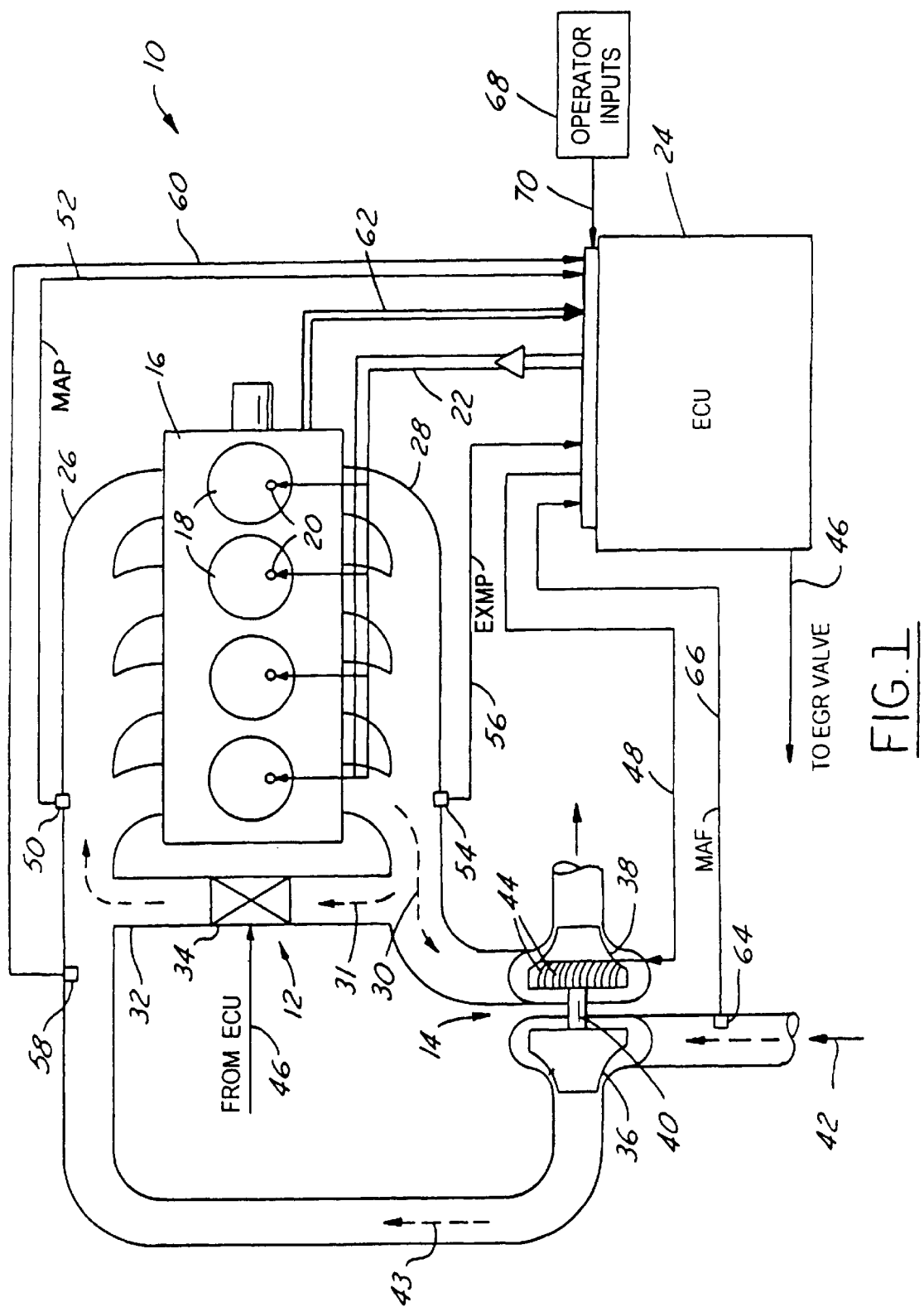
FIG. 1 is a schematic view of a compression ignition engine system having an EGR system and a VGT in accordance with one embodiment of the present invention.

Turning first to FIG. 1, there is shown a simplified schematic diagram of a compression ignition engine system 10 equipped with an exhaust gas recirculation (EGR) system 12 and a variable geometry turbocharger (VGT) 14. A representative engine block 16 is shown having four combustion chambers 18. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions, the engine is equipped with an EGR system 12. The EGR system 12 comprises a conduit 32 connecting the exhaust manifold 28 to the intake manifold 26. This allows a portion of the exhaust gases to be circulated from the exhaust manifold 28 to the intake manifold 26 in the direction of arrow 31. An EGR valve 34 regulates the amount of exhaust gas recirculated from the exhaust manifold 28. In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture.

The turbocharger 14 uses exhaust gas energy to increase the mass of the aircharge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 consists of a compressor 36 and a turbine 38 coupled by a common shaft 40. The exhaust gas 30 drives the turbine 38 which drives the compressor 36 which, in turn, compresses ambient air 42 and directs it (arrow 43) into the intake manifold 26. The VGT 14 can be modified as a function of engine speed during engine operation by varying the turbine flow area and the angle at which the exhaust gas 30 is directed at the turbine blades. This is accomplished by changing the angle of the inlet guide vanes 44 on the turbine 38. The optimal position for the engine guide vanes 44 is determined from the desired engine operating characteristics at various engine speeds.

As can be appreciated from FIG. 1, both the EGR system 12 and the VGT 14 regulate gas flow from the exhaust manifold 28. The effect of the EGR and VGT is, therefore, jointly dependent upon the conditions in the exhaust manifold 28.

All of the engine systems, including the EGR system 12, VGT 14 and fuel injectors 20 are controlled by the ECU. For example, signal 46 from the ECU 24 regulates the EGR valve position, and signal 48 regulates the position of the VGT guide vanes 44.

In the ECU 24, the command signals 46, 48 to the EGR system 12 and VGT 14 actuators are calculated from measured variables and engine operating parameters by means of a control algorithm. Sensors and calibratable lookup tables provide the ECU 24 with engine operating information. For example, manifold absolute pressure (MAP) sensor 50 provides a signal 52 to the ECU 24 indicative of the pressure in the intake manifold 26. Likewise, exhaust manifold pressure (EXMP) sensor 54 provides an EXMP signal 56 to the ECU 24 indicative of the pressure in the exhaust manifold 28. Further, an air charge temperature sensor 58 provides a signal 60 to the ECU 24 indicative of the temperature of the intake air charge 42. A mass airflow (MAF) sensor 64 also provides a signal 66 indicative of the compressor intake airflow to the ECU 24. Additional sensory inputs can also be received by the ECU along signal line 62 such as engine coolant temperature, engine speed, and throttle position. Additional operator inputs 68 are received along signal 70 such as acceleration pedal position. Based on the sensory inputs and engine mapping data stored in memory, the ECU controls the EGR to regulate the intake airflow (MAF), controls the VGT to regulate the intake manifold pressure (MAP) and controls injectors 20 to regulate fuel delivery.

Figure 2:
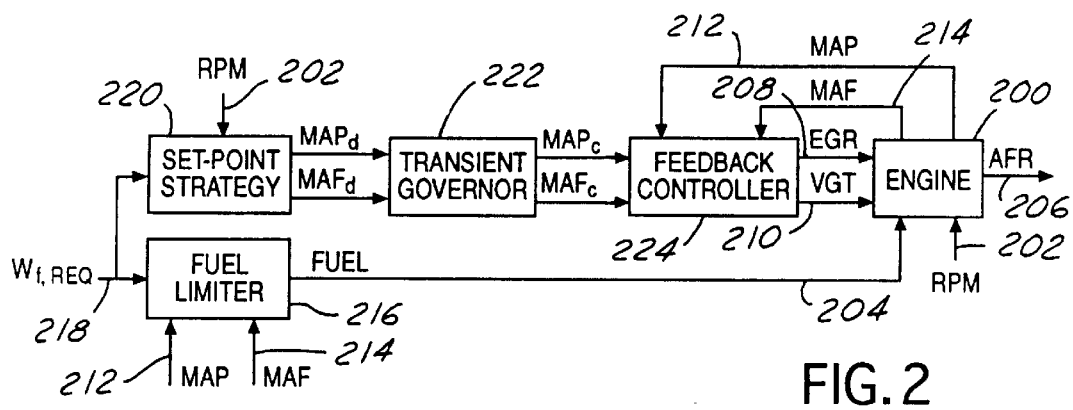
FIG. 2 is a control diagram for a compression ignition engine according to one embodiment of the present invention.

FIG. 2 is a control diagram for a compression ignition engine according to one embodiment of the present invention. In FIG. 2, the engine 200 is operating at a certain speed (in RPM) 202 and fueling rate 204 and outputs an exhaust gas having an oxygen content relating to the air/fuel ratio (AFR) 206. The composition of the AFR is governed by the position of the EGR value and VGT 210, and the fueling rate 204. The fueling rate 204, EGR flow 208 and VGT position 210 are, in turn controlled as a function of MAP 212 and MAF 214 feedback measurements. A fuel limiter 216 acts to limit the amount of fuel delivered to the engine 200 as a function of MAP 212, MAF 214, and the requested fueling rate, $W_{f,REQ}$, 218 to avoid the production of visible smoke. The desired values for compressor mass airflow, $MAF_d$, and boost pressure, $MAP_d$, are stored as lookup tables defining the setpoint strategy 220 as a function of the requested fueling rate 218 and the current engine speed 202. To achieve the desired values, $MAF_d$ and $MAP_d$, as quickly as possible, a transient governor 222 modifies the setpoints $MAP_d$, $MAF_d$ to $MAP_c$ and $MAF_c$ before passing them on to the feedback controller 224. The feedback controller 224 then drives the EGR value to achieve the desired MAF and VGT to achieve the desired MAP. Alternatively, or additionally, the feedback controller 224 coordinates the EGR and VGT control to achieve faster airflow response. The implementation of the control strategy of FIG. 2 will now be described with reference to FIG. 3.

Figure 3:
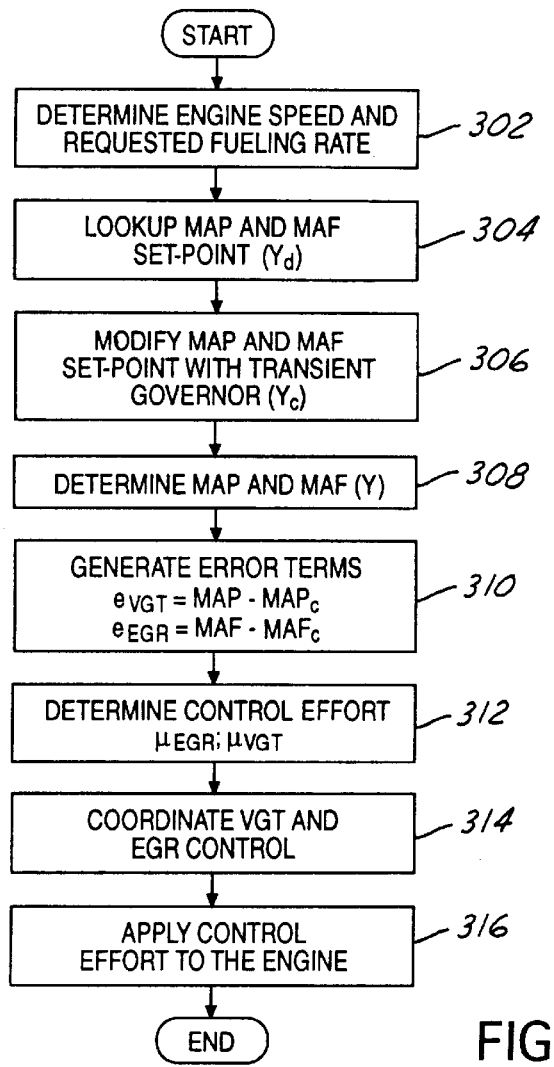
FIG. 3 is a flow diagram of one method of reducing turbo lag according to the present invention.

FIG. 3 is a flow diagram of one method of reducing turbo lag according to the present invention. This control logic resides in the ECU memory and is executed as part of the foreground logic routine which regulates and monitors engine operating conditions.

In step 302, the engine speed and requested fueling rate ($W_{f,REQ}$) are determined from signals 62 and 70, respectively, of FIG. 1. From these inputs, a lookup table provides setpoints for MAP and MAF (Step 304). If it is assumed that Y=(MAP,MAF), then the desired setpoints can be represented as $Y_d$=($MAP_d$,$MAF_d$). These setpoints are functions of engine speed and the desired fueling rate, therefore, $Y_d$=f(N,$W_{f,REQ}$) The transient governor modifies these setpoints at step 306 before feeding them to the feedback controller to increase the airflow response. Thus, the filtered setpoints are represented as $Y_c$=Tf(N(t),$W_{f,REQ}$(t)) wherein the filter, T, represents the transient governor.

In step 308, values for MAP and MAF are transmitted to the ECU from sensors 50 and 64 of FIG. 1. Alternatively, these values can be estimated from other engine operating inputs. For example, MAF can be estimated as a function of MAP and exhaust manifold pressure (EXMP) sensor measurements.

Referring again to FIG. 3, the measured values of MAP and MAF are compared to the modified desired setpoints, $MAF_c$, $MAP_c$, in step 310 to generate error values, $e_{VGT}$ and $e_{EGR}$. In step 312, the amount of EGR and VGT movement necessary to achieve $MAF_c$ and $MAP_c$, is determined from the error values.

The controller effort is then expressed as follows:

$u_{VGT}$(MAP-$MAP_c$)

$u_{EGR}$(MAF-$MAF_c$)

Preferably, the EGR and VGT movement necessary to achieve $MAF_c$ and $MAP_c$ is coordinated as in step 314 to further increase the airflow response. In step 314, the coordinated control is accomplished by adding the coordinated term to $u_{VGT}$ and/or $u_{EGR}$ as follows:

$u_{VGT}$(MAP-$MAP_c$)+$v_{VGT}$(MAF-$MAF_c$)

$u_{EGR}$(MAP-$MAP_c$)+$v_{EGR}$(MAF-$MAF_c$)

In step 316, the coordinated EGR and VGT positions (u+v) are then applied via the ECU to the EGR valve and VGT guide vanes.

The transient governor and feedback controller (222 and 224 of FIG. 2, respectively) will now be discussed in greater detail.

Setpoints for MAP and MAF are a function of fueling rate and engine speed. In particular, higher fueling rates correspond to higher setpoints for MAP and MAF. Since MAP increases by closing the VGT, and MAF increases by closing the EGR valve, conventional single loop controllers begin closing the VGT and EGR valve upon increased driver demanded power. Closing the VGT, however, increases the pressure in the exhaust manifold and, under certain conditions, will result in increased EGR flow although the EGR valve is simultaneously closing. This increased EGR flow displaces fresh air from the intake manifold, thereby reducing the fresh air charge, resulting in the opposite of the desired effect. Specifically, the desired action is for VGT to initially open and then close.

To remedy this, the transient governor modifies the setpoints for MAP and MAF so that a more aggressive control response is obtained. Specifically, the setpoint for MAF is increased and the setpoint for MAP is decreased as compared to the values obtained from the steady-state setpoint lookup table. The filtered setpoints that are fed to the feedback controller have the following form:

$$Y_c = Tf(N(t), W_{f,REQ}(t)) \quad (1)$$

wherein the filter, T, represents the transient governor. The filter T is a "wash-out" system in that it only modifies the setpoints during transient conditions, not during steady-state operation. One embodiment of the transient governor is the following transfer function matrix with the steady-state gain equal to identity:

$$T = \begin{pmatrix} (T_1 s+1)/(T_2 s+1) & 0 \\ 0 & (T_3 s+1)/(T_4 s+1) \end{pmatrix} \quad (2)$$

where $\tau_1$, $\tau_2$, $\tau_3$, and $\tau_4$ are parameters selected to achieve faster MAF response and slower MAP response relative to the engine operation without the transient governor. In one embodiment, the transient governor is applied only for requested fuel increases, and disabled for requested fuel decreases. Additionally, if the requested fuel increase is below a predetermined small threshold, the transient governor can be disabled.

The transient governor algorithm as given by the transfer function matrix (2) is discretized as follows:

$\Phi_1(t+1)=\Phi_1(t)+St(-\lambda_1\Phi_1(t)+\lambda_1(1-\mu_1)MAP_d)$ $MAP_c=\Phi_1(t)+-\mu_1 MAP_d$ $\Phi_2(t+1)=\Phi_2(t)+St(-\lambda_2\Phi_2(t)+\lambda_2(1-\mu_2)MAF_d)$ $MAF_c=\Phi_2(t)+-\mu_2 MAF_d$ where $\mu_1=T_1/T_2, \lambda_1=1/T_2$ $\mu_2 = T_3/T_4$, $\lambda_2 = 1/T_4$ The parameters $\lambda 1$, $\lambda 2$ control the convergence speed of $MAP_c$ to $MAP_d$ and of $MAF_c$ to $MAF_d$, respectively. Their values should be positive: $\lambda_1 > 0$, $\lambda_2 > 0$. The value of $\mu_1$ should be less than zero and the value of $\mu_2$ should be greater than zero to generate an undershoot in the set-point for MAP and an overshoot in the set-point for MAF. The transient governor algorithm is initialized at $\Phi_1(t') = MAF_d$ and $\Phi_2(t') = MAF_d$ at the time-instant t' when an aggressive tip-in is detected (i.e. when $W_f > W_{fREQ-E}$ where E is a deadband).

Simulated results for a 2.0 liter direct inject diesel engine model are shown in FIGS. 4a–4c, FIGS. 5a–5b, and FIGS. 6a–6b. In the figures the following values were used: $\tau_1 = -1$, $\tau_2 = 1$, $\tau_3 = 1.5$, and $\tau_4 = 0.25$. The transfer function for the proportional integral controller feedback controller from MAP and MAF errors to EGR and VGT position commands used in this simulation was of the form:

$$\begin{pmatrix} 0 & 2+0.2/s \\ 1+0.3/s & 0 \end{pmatrix}$$

Figure 4A:
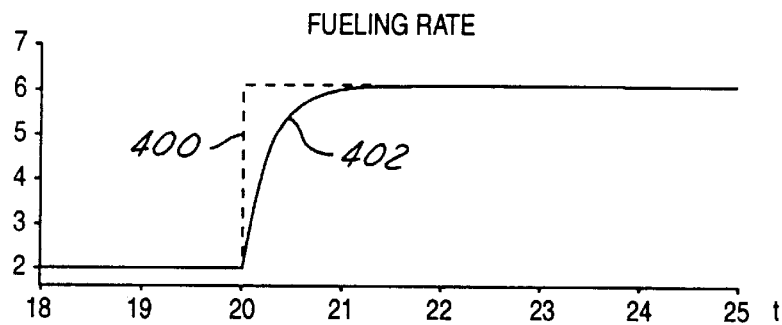
FIGS. 4a–c illustrate estimated EGR and VGT positions according to one control method of the present invention.
Figure 4B:
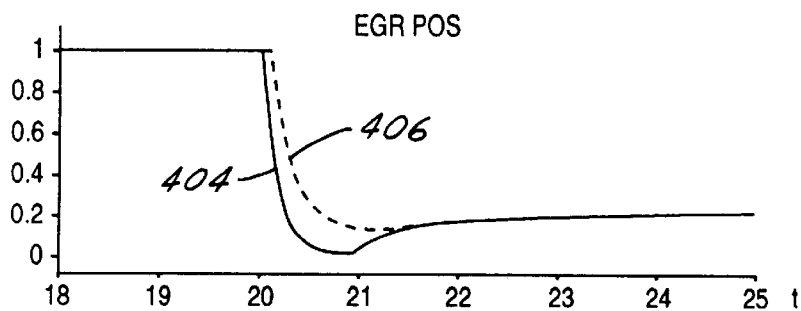
Figure 4C:
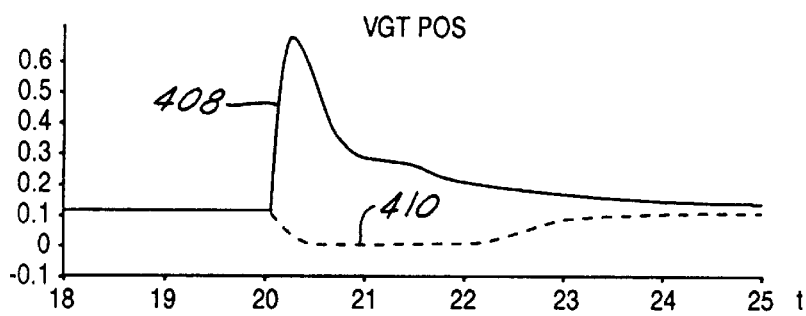
Figure 5A:
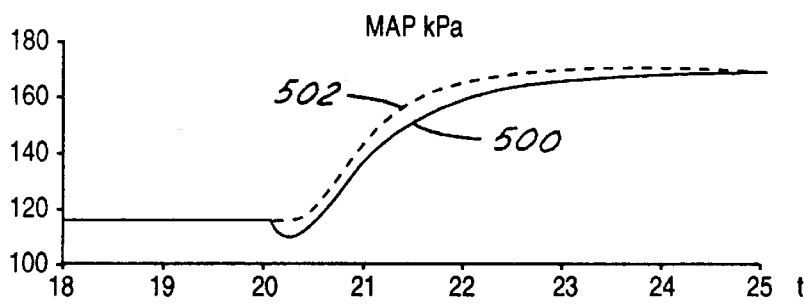
FIGS. 5a–b illustrate the MAF and MAP responses according to one control method of the present invention.
Figure 5B:
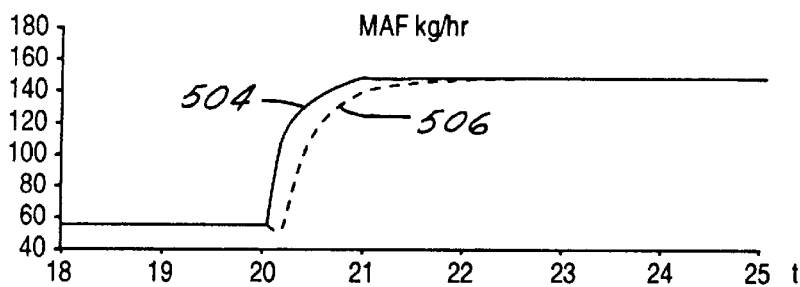
Figure 6A:
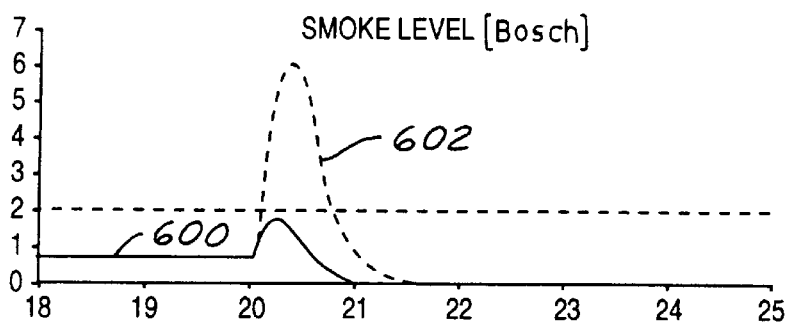
FIGS. 6a–b illustrate the air/fuel ratio and visible smoke responses according to one control method of the present invention.
Figure 6B:
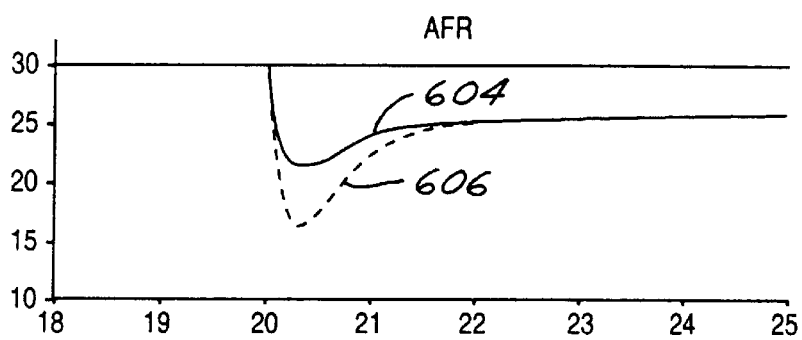

FIG. 4a shows the demanded fueling rate (line 400) and limited fueling rate (line 402), and resulting EGR and VGT positions. FIG. 4b shows the EGR position for the tip-in of FIG. 4a with the transient governor (line 404) and without the transient governor (line 406), and FIG. 4c shows the corresponding VGT position with the transient governor (line 408) and without the transient governor (line 410). The resulting MAP and MAF responses are shown in FIGS. 5a and 5b. In FIG. 5a, lines 500 and 504 represent the MAP and MAF responses with the transient governor, respectively, and lines 502 and 506 represent the MAP and MAF responses without the transient governor. Similarly, FIGS. 6a and 6b represent the resulting smoke level and AFR with the transient governor (lines 600, 604) and without (lines 602, 606). These figures demonstrate that the reduction in AFR and the peak of the smoke level can be significantly reduced when the transient governor is used to modify the setpoints for MAP and MAF.

In addition to the transient governor, or alternatively, control of the VGT can be coordinated with control of the EGR valve to prevent an increase in EGR flow upon increased driver demanded power. Specifically, the MAF error term can be fed back to the VGT by the feedback controller to allow the VGT to take appropriate action to increase MAF and decrease the EGR flow.

Accordingly, the control scheme provides a faster MAF response at the expense of a slower MAP response during transient engine operating conditions. The benefits of this scheme are most dramatic during low power engine operation. During tip-in at low power, a rapid increase in airflow is needed for complete combustion of the requested fuel. Hence, for transient conditions during low power operation, the control scheme can be expressed as follows:

$$EGR = K_{EGR,MAF}(MAF - MAF_d)$$

$$VGT = K_{VGT,MAF}(MAF - MAF_d) + K_{VGT,MAP}(MAP - MAP_d)$$

In the case of a coordinated proportional-integral controller, the control scheme can be expressed as follows:

$$\begin{pmatrix} EGR \\ VGT \end{pmatrix} = \begin{pmatrix} 0 & K_{pea} + K_{iea}/s \\ K_{pvp} + K_{ivp}/s & K_{pva} + K_{iva}/s \end{pmatrix} \begin{bmatrix} MAP - MAP_d \\ MAF - MAF_d \end{bmatrix}$$

where $K_{pva}$ and $K_{iva}$ are 0 for higher fueling rates ($W_f$). In other words, for higher power levels, the controller reduces to a single loop controller. In the control scheme, the first subscript represents proportional (p) or integral (i) control, the second subscript represents the VGT (v) or EGR (e), and the last subscript represents pressure (p) or airflow (a).

Figure 7A:
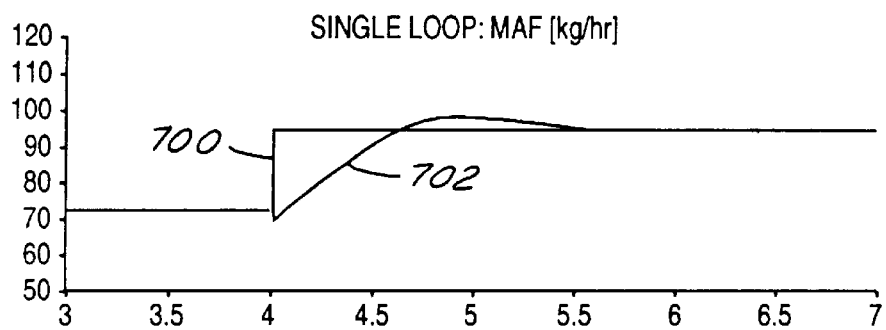
FIGS. 7a–b illustrate the MAF response according to the coordinated control method of one embodiment of the present invention.
Figure 7B:
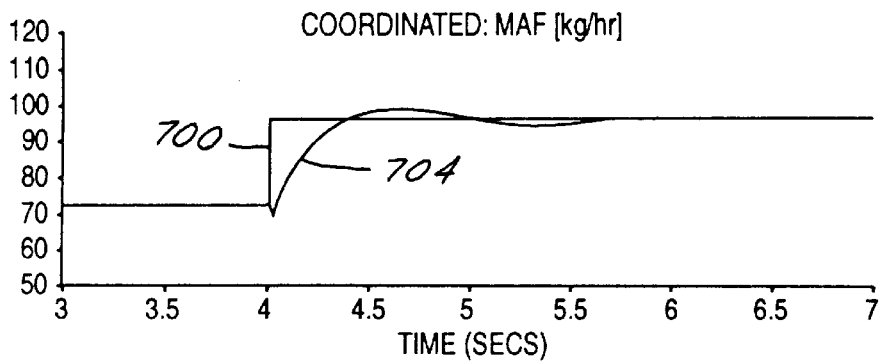

FIGS. 7a and 7b illustrate the MAF response for a single loop controller and coordinated controller, respectively. In FIGS. 7a and 7b, line 700 represents the desired MAP setpoint based on the lookup table values for the given engine speed and requested fueling rate. As can be seen, the time constant of the MAF response changes from approximately 0.5 seconds for single loop control (line 702) to approximately 0.25 seconds for coordinated control (line 704) for a fueling level step of 2 kg/h to 3 kg/h at 2000 RPM.

From the foregoing, it will be seen that there has been brought to the art a new and improved method of reducing turbo lag by modifying the transient setpoints for MAP and MAF and/or coordinating the control of the EGR and VGT to achieve faster MAF response.

While the invention has been described in connection with one or more embodiments, it will be understood that the invention is not limited to those embodiments. On the contrary, the invention covers all alternatives, modifications, and equivalents, as may be included within the spirit and scope of the appended claims.

What is claimed is:

1. In a compression ignition engine including a variable geometry turbocharger having a compressor and turbine, said turbine responsive to a turbocharger signal for regulating the intake manifold pressure (MAP), and an exhaust gas recirculation (EGR) passage having an EGR valve connecting an intake manifold and exhaust manifold of the engine, said EGR valve responsive to an EGR valve control signal for regulating the flow of exhaust gas and resulting mass airflow into said intake manifold (MAF), a method fo reducing turbo lag comprising the steps of:

determining an intake manifold pressure and intake manifold mass airflow setpoint, $MAP_d$ and $MAF_d$, as a function of the current engine speed and requested fueling rate ($W_{fREQ}$) said setpoints indicative of the desired MAF and MAP for the requested fueling rate;

generating modified setpoints, $MAF_c$ and $MAP_c$, as a function of $MAF_d$ and $MAP_d$, respectively;

determining a MAP value indicative of the current intake manifold pressure;

determining a MAF value indicative of the current intake manifold mass airflow:

generating said turbocharger signal as a function of $MAP_c$ and said MAP value;

generating said EGR valve control signal as a function of $MAF_c$ and said MAF value; and incrementally adjusting the position of said EGR valve and said turbocharger turbine as a function of said turbocharger signal and said EGR valve control signal until said MAF value corresponds to said $MAF_d$ and said MAP value corresponds to said $MAP_d$.

2. The method as set forth in claim 1 wherein the step of generating said turbocharger signal includes generating said turbocharger signal as a function of $MAP_c$, MAP, $MAF_c$, and MAF.

3. The method as set forth in claim 1 wherein the step of generating said EGR valve control signal includes generating said EGR valve control signal as a function of $MAP_c$, MAP, $MAF_c$, and MAF.

4. The method as set forth in claim 1 wherein the steps of generating said turbocharger signal and generating said EGR valve control signal includes the steps of generating said turbocharger signal and said EGR valve control signal as a function of $MAP_c$, MAP, $MAF_c$, and MAF.

5. The method as set forth in claim 1 wherein said modified setpoints $MAF_c$ and $MAP_c$ are generated as a function of $MAF_d$ and $MAP_d$ such that $MAF_c$ is greater than or equal to $MAF_d$ and $MAP_c$ is less than or equal to $MAP_d$.

6. In a compression ignition engine including a variable geometry turbocharger having a compressor and turbine, said turbine responsive to a turbocharger signal for regulating the intake manifold pressure (MAP), and an exhaust gas recirculation (EGR) passage having an EGR valve connecting an intake manifold and exhaust manifold of the engine, said EGR valve responsive to an EGR valve control signal for regulating the flow of exhaust gas and resulting mass airflow into said intake manifold (MAF), a method of reducing turbo lag comprising the steps of:

determining a first value indicative of the engine speed;

determining the current engine fueling rate ($W_f$);

determining the requested fueling rate ($W_{f,REQ}$);

determining a MAP value indicative of the current intake manifold pressure;

determining a MAF value indicative of the current intake manifold mass airflow; and if $W_{f,REQ} > W_f$, then determining an intake manifold pressure and intake manifold mass airflow setpoint, $MAP_d$ and $MAF_d$, as a function of said first value and $W_{f,REQ}$; generating modified setpoints, $MAF_c$ and $MAP_c$, as a function of $MAF_d$ and $MAP_d$, respectively; generating said turbocharger signal as a function of $MAP_c$, MAP, $MAF_c$, and MAF; generating said EGR valve control signal as a function of $MAF_c$ and said MAF value;

else, generating said turbocharger signal as a function of $MAP_d$ and said MAP value; generating said EGR valve control signal as a function of $MAF_d$ and said MAF value; and incrementally adjusting the position of said EGR valve and said turbocharger turbine as a function of said turbocharger signal and said EGR valve control signal until said MAF value corresponds to said $MAF_d$ and said MAP value corresponds to said $MAP_d$.

7. The method as set forth in claim 6 wherein the step of generating said EGR valve control signal includes generating said EGR valve control signal as a function of $MAP_c$, MAP, $MAF_c$, and MAF.

8. In a compression ignition engine including a variable geometry turbocharger having a compressor and turbine, said turbine responsive to a turbocharger signal for regulating the intake manifold pressure (MAP), and an exhaust gas recirculation (EGR) passage having an EGR valve connecting an intake manifold and exhaust manifold of the engine, said EGR valve responsive to an EGR valve control signal for regulating the flow of exhaust gas and resulting mass airflow into said intake manifold (MAF), a method of reducing turbo lag comprising the steps of:

determining a first value indicative of the engine speed;

determining the current engine fueling rate ($W_f$);

determining the requested fueling rate ($W_{f,REQ}$);

determining a MAP value indicative of the current intake manifold pressure;

determining a MAF value indicative of the current intake manifold mass airflow;

determining an intake manifold pressure and intake manifold mass airflow setpoint, $MAP_d$ and $MAF_d$, as a function of said first value and $W_{f,REQ}$;

generating said turbocharger signal as a function of $MAP_cS$, MAP, $MAF_c$, and MAF;

generating said EGR valve control signal as a function of $MAF_c$ and MAF; and incrementally adjusting the position of said EGR valve and said turbocharger turbine as a function of said turbocharger signal and said EGR valve control signal until said MAF value corresponds to said $MAF_d$ and said MAP value corresponds to said $MAP_d$.

9. The method as set forth in claim 8 wherein the step of generating said EGR valve control signal includes generating said EGR valve control signal as a function of $MAP_c$, MAP, $MAF_c$, and MAF.

\* \* \* \* \*